US006326212B1

(12) United States Patent
Aoki

(10) Patent No.: US 6,326,212 B1
(45) Date of Patent: Dec. 4, 2001

(54) MEMBRANE DISPENSING HEAD APPARATUS AND METHOD FOR DISPENSING LIQUID

(75) Inventor: Dennis Aoki, Los Angeles, CA (US)

(73) Assignee: Arden Systems, Inc., Los Angeles, CA (US)

( * ) Notice: Subject to any disclaimer, the term of this patent is extended or adjusted under 35 U.S.C. 154(b) by 0 days.

(21) Appl. No.: 09/416,581

(22) Filed: Oct. 12, 1999

(51) Int. Cl.[7] .............................. G01N 1/10; B01L 3/02; B67B 7/00

(52) U.S. Cl. ...................... 436/180; 422/100; 73/863.32; 73/864.01; 73/864.11; 222/1

(58) Field of Search .................................. 422/100, 101; 436/180; 73/864.01, 864.11, 864.13, 863.32; 222/1, 263

(56) References Cited

U.S. PATENT DOCUMENTS 3,568,735 * 3/1971 Lancaster ............................ 141/238
3,650,306 * 3/1972 Lancaster ............................ 141/238
4,444,062 * 4/1984 Bennett et al. .................. 73/863.32
4,461,328 * 7/1984 Kenny .................................. 141/67
4,927,604 * 5/1990 Mathus et al. ...................... 422/101
5,100,626 * 3/1992 Levin .................................. 422/100
6,039,211 * 3/2000 Slater et al. ........................ 222/151
6,258,324 * 7/2001 Yiu ..................................... 422/100

* cited by examiner

*Primary Examiner*—Jill Warden
*Assistant Examiner*—Brian R. Gordon
(74) *Attorney, Agent, or Firm*—Oppenheimer Wolff & Donnelly LLP

(57) ABSTRACT

A membrane actuated fluid dispensing head apparatus and method for dispensing fluids. The dispenser housing has a top plate, a bottom plate, and a fluid distribution plate disposed between the top and bottom plates. The top plate has fluid inlet means therethrough for admitting pressurized fluid over the distribution plate, the bottom plate having a plurality of elongated hollow pipettes thereon extending away from the top plate and in fluid communication with the fluid distribution plate. A first resilient membrane is disposed between the fluid distribution plate and the bottom plate, the bottom plate having a plurality of spaced cavities thereon having outer peripheries and in fluid communication with the pipettes. A second resilient membrane is disposed between the top plate and the distribution plate having an opening therethrough. The fluid distribution plate has a plurality of spaced apertured members having outer peripheries, some of the outer peripheries of the members substantially coinciding with some of the outer peripheries of the cavities whereby, when a pressurized source of fluid is injected into the dispenser housing via the inlet means, the fluid flows under pressure over the fluid distribution plate, out of the apertures in the members and against the membrane forcing portions of the membrane down into the cavities and out the pipettes.

13 Claims, 3 Drawing Sheets

MEMBRANE DISPENSING HEAD APPARATUS AND METHOD FOR DISPENSING LIQUID

BACKGROUND OF THE INVENTION

1. Field of the Invention

The invention relates to fluid dispensing apparatus and method for dispensing liquids; and, more particularly, to a membrane actuated fluid dispenser for delivering the fluid through a plurality of pipettes.

2. Related Art

Dispensing apparatuses capable of simultaneously delivering fluid through a plurality of pipettes are well known in the art. One such example is shown in U.S. Pat. No. 3,572,552, to Guinn and No. 3,807,235 to Lefkovits. Both patents use vacuum or pressure only which does not address the diaphragm (membrane) sag problem. When an elastic membrane is clamped down, it attempts to squeeze into available voids. The cavities are available voids and the excess membrane material bunches up in the cavity and sometimes wrinkles and sags into the cavity. This adversely affects the accuracy of the dispensed volume.

In addition, diaphragm blockage of holes is a problem with certain cavity shapes and hole locations. These patents that use a flat surface immediately above or below the cavity are subject to this. When the diaphragm wrinkles or sags, then vacuum or pressure is applied, if the diaphragm has a sag or wrinkle near the hole then the wrinkle or sag gets forced over the hole, thus blocking its operation.

There is an uneven sealing towards the center of the array of cavities that results when a membrane is peripherally clamped between two large flat plates. It is difficult to seal such an arrangement because the large forces required will bend the plates and they will actually lift up in the center, thus unsealing the center cavities.

Membranes that conform to the shape of the chamber as in these prior art patents forego the possibility of variable volume dispensing.

The use of fixed dispensing needles makes cleaning and contamination control much more difficult.

such prior art devices allows the dispensed fluid to enter the cavity. This makes it difficult to clean and control contamination.

There is thus a need for a fluid dispenser which dispenses a liquid through one or more pipettes in a controlled manner.

SUMMARY OF THE INVENTION

It is an object of this invention to provide an improved apparatus and method for dispensing liquid out of at least one pipette.

It is a further object of this invention to utilize fluid under pressure to flex a membrane against apertured cavities in a plate deforming the membrane into the cavities and out apertures in the cavities into hollow pipettes aligned with the cavities.

It is an object of this invention to carry out the foregoing object by reversing the pumping of fluid thereby drawing liquid into which the pipettes may be disposed up into the pipettes wherein reversing the air pressure ejects the drawn-up liquid out of the pipettes.

These and other objects are preferably accomplished by providing a membrane actuated fluid dispensing head having a dispenser housing with a top plate, a bottom plate, and a fluid distribution plate disposed between the top and bottom plates. The top plate has fluid inlet means therethrough for admitting pressurized fluid over the distribution plate, the bottom plate having a plurality of elongated hollow pipettes mounted thereon extending away from the top plate and in fluid communication with the fluid distribution plate.

A first resilient membrane is disposed between the fluid distribution plate and the bottom plate, the bottom plate having a plurality of spaced cavities thereon having outer peripheries and in fluid communication with the pipettes. A second resilient membrane is disposed between the top plate and the distribution plate having an opening therethrough. The distribution plate has a plurality of spaced apertured members having outer peripheries, some of the outer peripheries of the members substantially coinciding with some of the outer peripheries of the cavities whereby, when a pressurized source of fluid is injected into the dispenser housing via the inlet means, the fluid flows under pressure over through the opening in the second membrane over the distribution plate, out of the apertures in the members and against the membrane forcing portions of the membrane down into the cavities and out the pipettes.

The injection of pressurized fluid can be used to pump fluid out the pipettes, then reversed to draw liquid up into the pipettes (when dipped into a liquid), then reversed again to eject the liquid out the pipettes.

DESCRIPTION OF THE PREFERRED EMBODIMENTS

Figure 1:
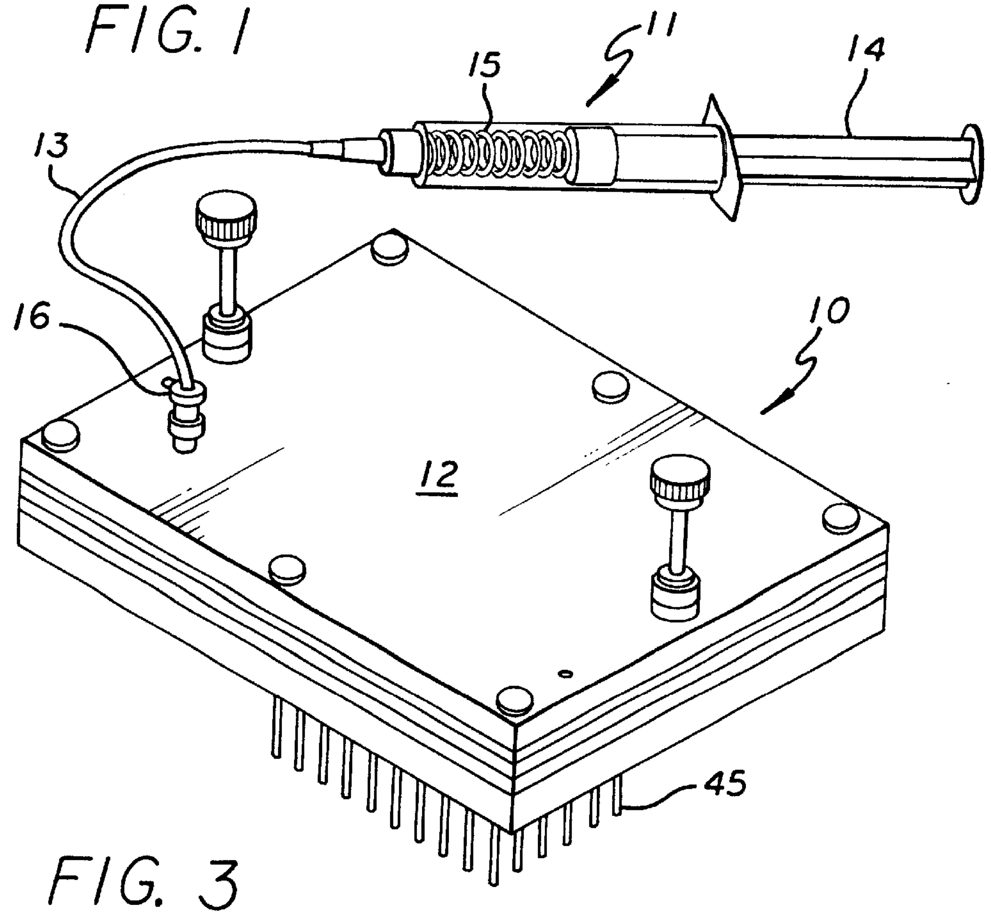
FIG. 1 is an assembled perspective view of the membrane dispensing head apparatus of the invention.

Referring now to FIG. 1 of the drawing, a membrane dispensing head apparatus 10 is shown having an injector in the form of a syringe 11 coupled to top plate 12 of apparatus 10 by flexible tubing 13. Syringe 11 includes the usual plunger 14 and an internal spring 15 for delivering a fluid, such as air or oil, under pressure, upon actuation of plunger 14, through tubing 13 to the inlet 16 coupled to top plate 12, as by threading into a threaded hole therein, as is well known in the art. Inlet 16 is in fluid communication with both sides of top plate 12.

Figure 2:
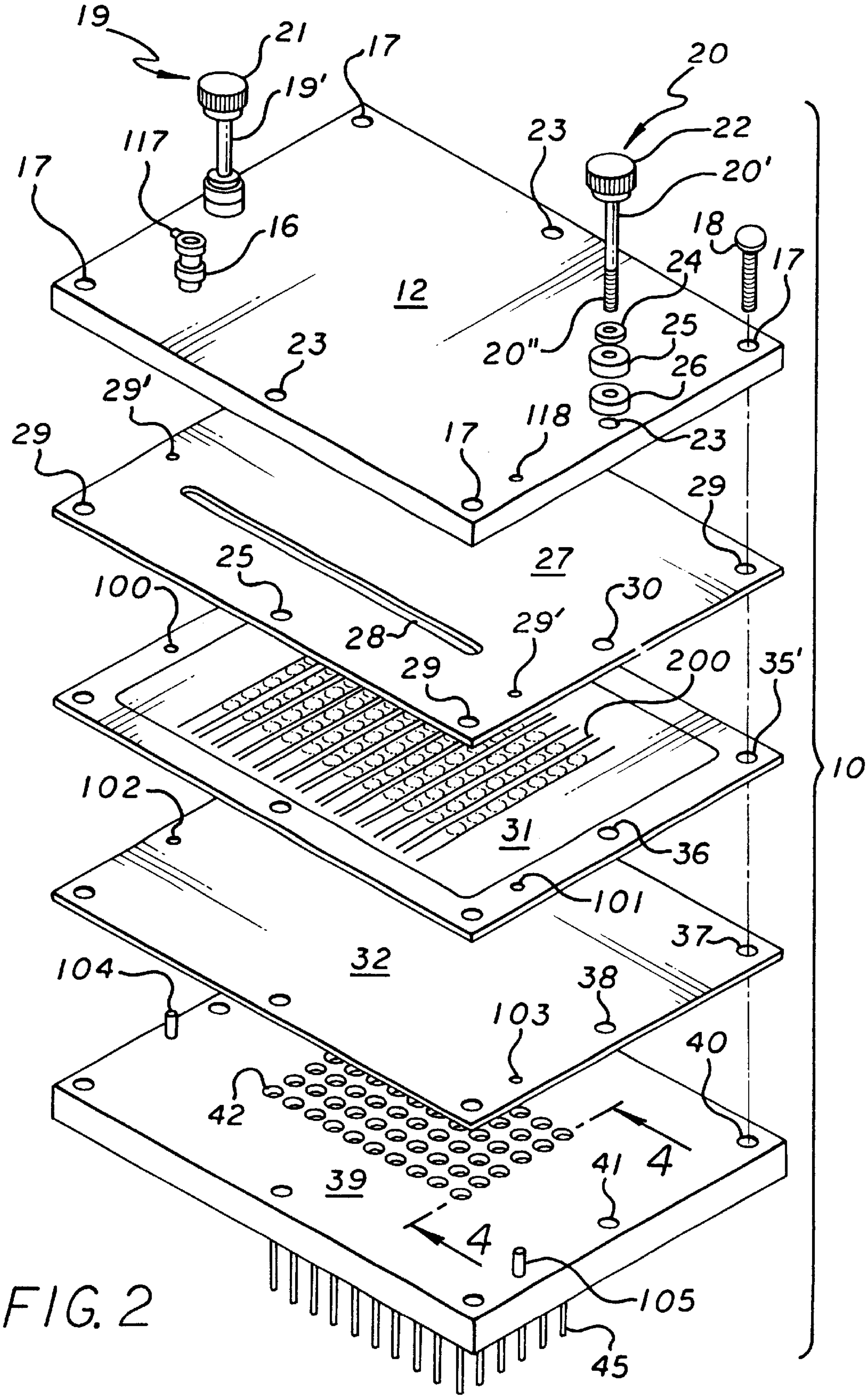
FIG. 2 is an exploded view of a portion of the apparatus of FIG. 1.
Figure 5:
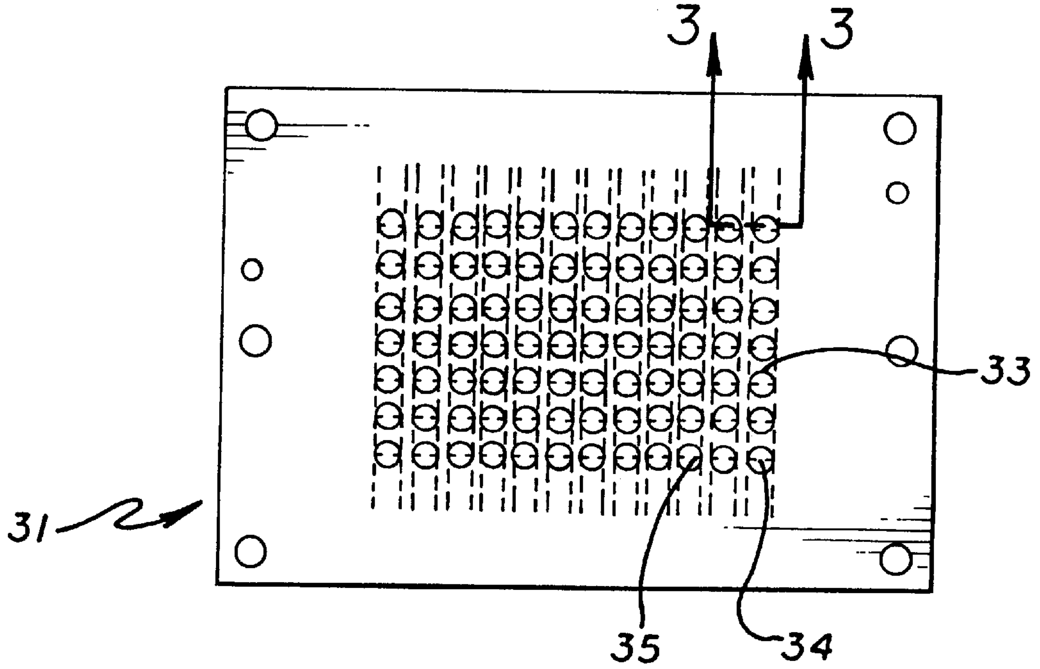
FIG. 5 is a view taken along line 5–5 of FIG. 2.

As seen in FIG. 2, the various components of apparatus 10, excluding syringe 11 and tubing 13, is shown in exploded view. Thus, top plate 12 has a plurality of non-threaded corner through-holes 17 about its periphery for received threaded bolts 18 therethrough for reasons to be discussed. One or more quick release knobs, such as two threaded knobs 19, 20, having knurled enlarged heads 21, 22, respectively, may be provided adapted to extend into side holes 23 (the hole in plate 12 associated with knob 19 is not visible) to provide a quick, release. That is, each knob 19, 20 has a smooth upper shaft portion 19', 20', respectively, and a lower integral threaded shaft portion (only 20" visible in FIG. 1) so that the upper shaft portions extend through non-threaded holes 17 (and aligned holes to be discussed), the threaded portions exiting out of the assembled plates in FIG. 1 whereby the latter may be threaded to suitable apparatus (not shown) in which apparatus 10 is to be used. Knobs 21, 22 may be rotated to quickly and easily secure apparatus 10 in position or release the same. A plurality of spacers and washers, such as washer 24 and spacers 25, 26, may be provided with each knob.

Oppositely spaced unthreaded holes 117 and 118 are also provided through plate 12 for receiving a pair of spaced alignment pegs therethrough, as will be discussed.

Top plate 12 is adapted to abut against flexible inner overlay 27, which is configured similarly to plate 12, having an elongated slot 28 therethrough close to one edge of plate 31 for reasons to be discussed. A plurality of corner peripheral holes 29 extend through overlay 27 aligned with holes 17. Like side holes 30 are also provided aligned with holes 23. Holes 29', 29" are aligned with holes 117, 118, respectively.

Figure 3:
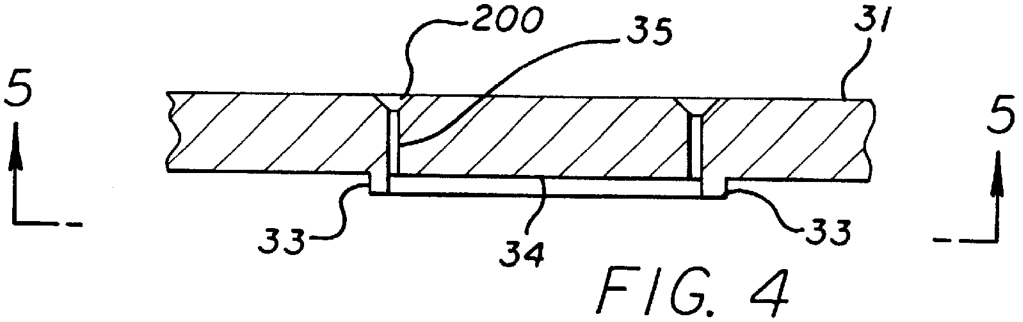
FIG. 3 is a view taken along line 3–3 of FIG. 5 but illustrating the opposite side of plate 31.

A fluid distribution plate 31 is provided sandwiched between a lower overlay 32, also of a resilient material, and first overlay 27. Plate 31 has a plurality of spaced grooves 200 aligned with holes 35 (see FIG. 3) as will be discussed.

Distribution plate 31 is configured similarly to plate 17 and overlays 27, 32 and has a plurality of elongated spaced circular ridges 33 (see FIG. 3) extending transversely across plate 31 and facing plate 39. Plate 31 has a plurality of rows of spaced concave depressions 34 concentrically disposed within each of the circular raised ridges 33, each depression 34 having one or more apertures 35, preferably two adjacent each side of the circular ridge, therethrough for reasons to be discussed. Peripheral corner holes 35' through plate 31 are aligned with aforementioned holes 29, 17. Like side holes 36 are aligned with aforementioned holes 23, 30, hole 100 is aligned with holes 29', 117 and hole 101 is aligned with holes 29", 118.

The lower overlay 32 also has peripheral corner holes 37 aligned with holes 35', 29 and 17 and side holes 38 aligned with holes 36, 30 and 23. Overlay 32 is of a flexible material and abuts against a pipette plate 39. Overlap 32 also has a hole 103 aligned with holes 101, 29" and 118, and a hole 102 aligned with holes 100, 29' and 117. Pipette plate 39 is of a rigid material and has a plurality of comer peripheral threaded holes 40 aligned with holes 37, 35', 29 and 17. Plate 39 also has spaced side holes 41 aligned with holes 38, 36, 30 and 23. Upstanding pegs 104, 105 are fixedly mounted on plate 39 extending toward plate 12.

Figure 4:
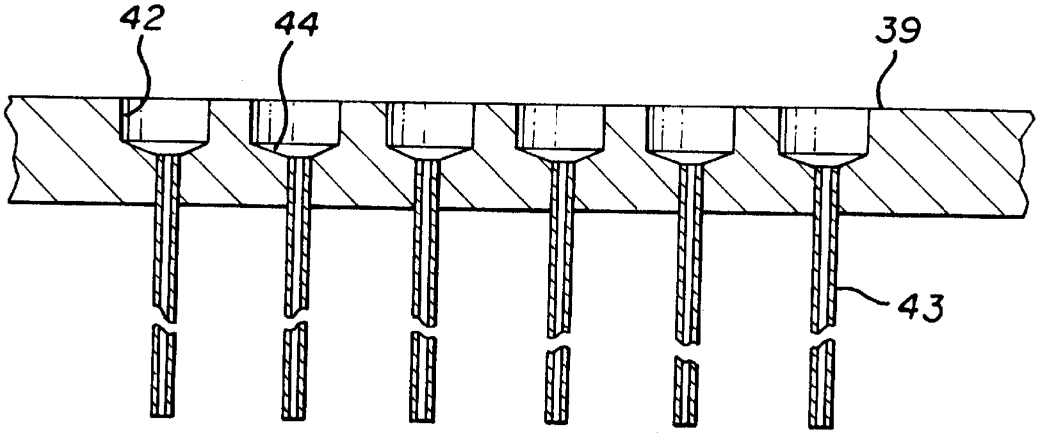
FIG. 4 is a view taken along line 4–4 of FIG. 2.
Figure 6:
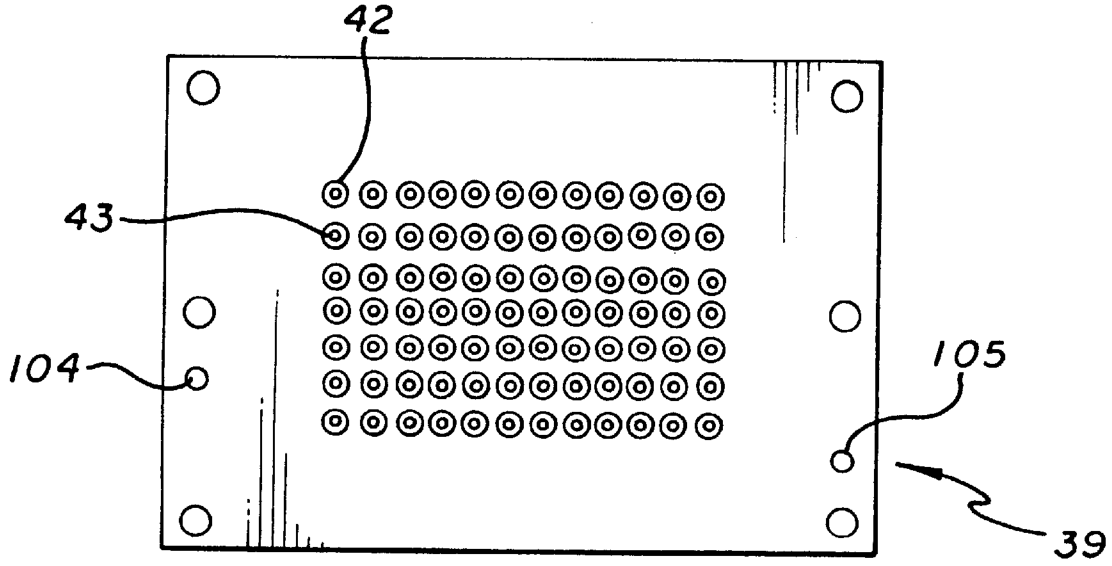
FIG. 6 is a top plan view of the plate 39 alone of FIG. 2.

A plurality of spaced rows of concave depressions 42 are provided in bottom plate 39. As seen in FIG. 4, each depression 42 has a central hole 43 (FIG. 6) and is aligned at its center or bottom area 44 with an elongated needle or pipette 45. Each pipette 45 is hollow and its interior opens into fluid contact with the interior of each depression 42 via holes 43. Circular ridges 33 are able 0.010" high and in width and serve a double function. Without raised ridges 34, thousands of pounds of pressure would be needed to compress the membrane 32 enough so that it will seal. When this much pressure is applied at the periphery of the housing, the entire plate warps and the membrane would., not seal the cavities toward the center of the housing. The circular ridges 33 provide an individual seal through pressure on the membrane around each depression 34 and around each cavity 42 that requires just one or two pounds to seal each cavity in pipette plate 39. Now, only a couple of hundred pounds are needed to seal the membrane 32 and the top and bottom plates 12, 39 do not bend enough to create any leakage.

When vacuum is applied to aspirate (suck up) the dispensed medium, if the membrane 32 was allowed to cover the small holes 35 in the fluid distribution plate 31, then the membrane 32 would not be drawn up tight against the distribution plate 31 because the vacuum would be cut off by the membrane 31 covering the holes 35. By putting the small holes 35 immediately adjacent to the inside wall of the circular ridges 33, the membrane 32 is unable to stretch enough to conform to the sharp vertical walls of the ridge 33 and cover the holes 35.

Although two holes 35 adjacent each side of cavities 34 are disclosed, this number can vary. More holes allows for the use of a more viscous fluid than air. Larger/smaller holes could be used for faster/slower delivery or aspiration.

In assembly of the parts in FIG. 2, overlay 32 may be placed against plate 39, pegs 104, 105 entering holes 102, 103, respectively (pegs 104, 105 may be off-center from each other along with their respective holes forming alignment means for the assembled parts).

Plate 31, with depressions 34 facing overlay 32, is now mounted on top of overlay 32, peg 104, entering aligned holes 102, 100 and peg 105 entering aligned holes 103, 101. Overlay 27 is now mounted against plate 31, slot 28 transversely crossing the ends of the spaced grooves 200 adjacent the edge of plate 31. Peg 105 extends through and aligns with holes 103, 101 and 29". Peg 104 extends through and aligns with holes 102, 100 and 29'.

Finally, top plate 12 is mounted against overlay 27, peg 105 entering hole 118 and peg 104 entering hole 117 thus aligning the assembled parts. Screws 18 are now extended through the non-threaded end peripheral aligned holes in overlays 27, 32 and plate 31 and threaded into threaded end peripheral holes 46 in plate 39.

Knobs 21, 22 may be extended through the aligned side peripheral holes with the threaded portions 20" extending on the outside of plate 39 whereby the entire apparatus may be secured to its intended application. Tubing 13 is inserted into inlet 16 and secured therein in any suitable manner.

In operation, pressurized pumping fluid is supplied to inlet 16 (illustrated by the syringe 11 being actuated downwardly), to force the pumping fluid under pressure through tubing 13 and through slot 28 of overlay 27. This fluid, under pressure, is distributed across manifold plate 27 into one end of the grooves 200, along grooves 200, and through holes 35 and about depressions 34 on the opposite side of manifold plate 31. The depressions 34 are aligned with depressions 42 in plate 39 (separated by flexible overlay 32 which is the elastic membrane).

Thus, fluid pressure against the inner overlay 32 distends overlay 32 forcing the portions of overlay 32 overlying depressions 42 against and down into the same, thus, in effect, pumping fluid out of holes 43 through the aligned pipettes 43 and dispensing whatever liquid may be in the pipettes. The pipettes 43 at this stage may be disposed in a suitable liquid.

Plunger 14 of syringe 11 is now released and, under spring pressure, returns to the FIG. 1 position drawing the membrane 32 back up to plate 31 and also drawing liquid up through the pipettes. Syringe 11 is now reactivated, thus again applying fluid pressure ejecting the drawn-up liquid out of the pipettes.

Any suitable materials and dimensions may be used. For example, overlays 27 and 32 may be made of silicon rubber. Plate 31 may be of stainless steel. DELRIN® plastic may also be used. Plates 12 and 39 may be of stainless steel along with pipette 45 or nipple for disposable tips secured thereto in any suitable manner.

Although a particular number of ridges 33 and aligned grooves 200 are disclosed, any suitable number may be used. Any suitable number of depressions 34, 42 may also be used along with any suitable number or placement of holes 35, 43. For example, the outer peripheral rows of depressions in both plates 31, 39 may not be apertured if desired.

Any suitable rigid non-porous material may be used with strategically placed openings where the fluid can exit and be forced against membrane overlay 32 to flex the same down into cavities or depressions 42.

Although a conventional syringe 11 is disclosed for delivering fluid under pressure, obviously more sophisticated conventional pressure regulated pressurized fluid apparatus may be used. Thus, both pressure and vacuum may be used.

Instead of fixed stainless steel pipettes, nipples with disposable tips may be mounted on the pipettes and removed therefrom. Although the term pipette has been used to refer to the spaced apertured members, spaced nipples may be used receiving the disposable types thereon. The spaced nipples broadly act as pipettes receiving the removable nipples therefrom.

The apparatus disclosed herein may be used as a fluid dispensing head in other suitable apparatus. For example, such other apparatus may provide for the dispensing head apparatus of the invention to fill pipette 45 at one position, then dispense the sucked in liquid at another. Such other apparatus could also provide regulated pressurized fluid (where the pressure can be positive, negative or both) to the apparatus 10 without the syringe 11). This other apparatus can be made integral to the apparatus or can be a separate module connected with appropriate tubes and/or wires for control. The head movement apparatus can be simply a provision for handheld movement or at the other extreme it can be attached to a fully automated robotic device. Alternatively, the head can remain in one location and the reservoir and item the liquid is being dispensed to can move to the head. The movement apparatus and the pressurized fluid source may be any suitable apparatus well known in the art.

Thus, the apparatus 10 may be a handheld low priced device that could possibly have the pressure pump and electrical control elements combined in a single unit attached to the apparatus. The other extreme would have the apparatus attached to a robotic arm and the pressure pump and electrical controls remotely located and controlled by a computer. In between the two extremes other configurations may occur to one skilled in the art.

Any suitable dimensions may be used. For example, overlays 27 and 32 may be about 0.030" thick. Slot 28 may be about 3½ inches long and ⅛-inch wide. Plates 12 and 39 may be about 0.5" thick. Manifold plate 31 may be about 0.025" thick. Apparatus 10, without syringe 11, may be a portable handheld device. Depressions 34 and 42 may be about 0.2" in diameter. Holes 43 may be about 0.027" in diameter. Holes 35 may be about 0.01" in diameter. Pipettes 45 may have openings about 0.027" in inner diameter and about 0.040" on the outer diameter.

By using vacuum and pressure in my invention, wrinkles and sags are taken up by forcing the membrane into contact with the lower surface of the pumping fluid distribution plate.

The small holes placed immediately next to the inside wall of the "circular ridges" avoids this problem in the prior art.

The "circular ridges" provide sealing even though low clamping forces are used. The invention can easily be adapted to the use of disposable commercially available dispensing tips.

By using a regulated an calibrated fluid pressure source, such as an air pump and a vacuum pump working through an adjustable regulator, complete control is provided over the dispensing mechanism up to the limits of the volume range that it was designed for. None of the prior art patents addresses the problem of dispensing the small amount that would remain in the needle or dispensing tip due to capillary action. The invention herein allows for a small extra mount of delivery pressure to dispense this small amount.

The size of the pipettes or needles disposable tips may be adjusted so that the dispensed fluid never enters the cavities. The volume within the needles or tip is sufficient to hold the entire dispensed volume.

Advantages of my invention are as follows:

1. Low membrane clamping pressure (because of the circular ridges) on the membrane allows use of molded plastic parts for high volume production;
2. No possibility of blockage of holes by the membrane;
3. Variable volume because of the use of an adjustable and regulated source of pumping fluid pressure. By arranging for a small increase in the delivery pressure, the small remaining volume in the tip can be dispensed if desired;
4. Easily cleaned if adapted to use commercially available disposable tips; and
5. Much lower cost than using individual syringes.

Membranes 32 may be made of metal or other elastic material.

Changing the overall height of the circular ridges can provide increased volume.

Prior art devices do not address contamination or cleaning. The dispensed volume of my invention is intended to remain within the needle or disposable tip. Thus, only the needle needs to be cleaned and the membrane and chamber never contact the dispensed fluid. If disposable tips are used, the tips are changed to eliminate cleaning and contamination.

An extra shot of dispensing air pressure to expel portion retained by capillary action can easily be accomplished with my invention while it is not easily accomplished with those inventions that use excess pressure or vacuum to force the membrane to conform to the shape of the cavity. Forcing conformance also puts a concentrated stress point on the membrane at the opening where the vacuum or pressure tries to force the membrane through the hole.

Use of regulated and calibrated vacuum and pressure to vary the volume within a volume range specific for the materials and dimensions of the particular dispensing head allows for easy varying of the dispensed volume.

Although a particular embodiment of the invention is disclosed, variations thereof may occur to an artisan and the scope of the invention should only be limited by the scope of the appended claims.

I claim:

1. Membrane actuated fluid dispensing head apparatus comprising:

a dispenser housing comprising a top plate, a bottom plate, a fluid distribution plate disposed between the top and bottom plates, said top plate having fluid inlet means therethrough for admitting pressurized fluid onto and over said distribution plate, said bottom plate having a plurality of elongated hollow pipettes mounted on said bottom plate extending away from said top plate and in fluid communication with said fluid distribution plate; and a first resilient membrane disposed between said distribution plate and said bottom plate, said bottom plate having a plurality of spaced cavities thereon having outer peripheries and in fluid communication with said pipettes, said distribution plate having a plurality of spaced apertured members having outer peripheries, some of said outer peripheries of said members substantially coinciding with some of the outer peripheries of said cavities;

a second resilient membrane disposed between said top plate and said distribution plate having an opening therethrough in fluid communication with both the top plate and the distribution plate;

whereby, when a pressurized source of fluid is injected into said dispenser housing via said inlet means, said fluid flows under pressure over said distribution plate, out of the apertures in said members and against said membrane forcing portions of said membrane overlying said cavities down into said cavities thus displacing any fluid in said pipettes out of said pipettes, then drawing up any fluid into which said pipettes are disposed up into said pipettes when injection by said source of fluid is reversed.

2. The apparatus for claim 1 wherein said air inlet means includes a source of adjustable, pressurized, regulated, pumping fluid having a flexible tubing coupled to said top plate through said inlet.

3. The apparatus of claim 1 wherein said fluid communication between said fluid distribution plate and said top plate is provided by an elongated slot through said second membrane.

4. The apparatus of claim 1 wherein said fluid distribution plate includes a plurality of elongated spaced grooves on the side of said distribution plate facing said top plate, a plurality of spaced apertures disposed along said grooves providing fluid communication between said top plate and said bottom plate and said first membrane, said spaced peripheral surfaces of said members coinciding with the peripheries of spaced ones of said cavities in said pipette plate being raised, said apertures along said grooves coinciding with the apertures in said members.

5. The apparatus of claim 1 wherein said opening through said second membrane is an elongated slot overlying said grooves adjacent one end thereof.

6. The apparatus of claim 5 wherein each of said members has a first pair of apertures aligned with the apertures along one of said grooves and a second pair of apertures aligned with the apertures along another of said grooves spaced from said last-mentioned one of said grooves.

7. The apparatus of claim 5 wherein said spaced raised peripheral surfaces are circular.

8. The apparatus of claim 7 wherein said raised peripheral surfaces are about 0.01" to 0.02" in overall height.

9. The apparatus of claim 8 wherein said apertures through said cavities include at least one aperture and adjacent the peripheral wall forming said raised surface within said each of said cavities and at least one aperture adjacent the peripheral wall opposite said first mentioned at least one aperture.

10. The apparatus of claim 1 including alignment means associated with all said plates and said membranes aligning the same when assembled in abutting relationship.

11. The apparatus of claim 1 wherein said fluid inlet means includes a fluid inlet mounted on the exterior of said top plate in fluid communication with said fluid distribution plate.

12. A method for dispensing liquid out of a plurality of pipettes mounted to a membrane actuated dispenser head, said head comprising a dispenser housing comprising a top plate, a bottom plate, a fluid distribution plate disposed between the top and bottom plates, said top plate having fluid inlet means therethrough for admitting pressurized fluid onto and over said distribution plate, said bottom plate having a plurality of elongated hollow pipettes mounted on said bottom plate extending away from said top plate and in fluid communication with said fluid distribution plate, a first resilient membrane disposed between said fluid distribution plate and said bottom plate, said bottom plate having a plurality of spaced cavities thereon having outer peripheries and in fluid communication with said pipettes, said fluid distribution plate having a plurality of spaced apertured members having outer peripheries, some of said outer peripheries of said members substantially coinciding with some of the outer peripheries of said cavities, a second resilient membrane disposed between said top plate and said fluid distribution plate having an opening therethrough in fluid communication with both said top plate and said distribution plate, the method comprising the steps of:

dipping said pipettes into a liquid;

injecting fluid under pressure into the dispenser housing against said fluid distribution plate, out the apertures therein and against said membrane forming a fluid tight seal between the outer peripheries of said members and respective ones of the outer peripheries of said spaced cavities thereby forcing portions of said membrane down into said cavities thereby pumping air out of said pipettes;

dipping said pipettes into a liquid;

reversing said injection of air thereby drawing liquid into which the pipettes are dipped up into said pipettes; and subsequently reversing the injection of fluid to thereby expel said liquid in said pipettes out of said pipettes.

13. A dispenser housing comprising a top plate, a bottom plate, a pumping fluid distribution plate disposed between the top and bottom plates, said top plate having pumping fluid inlet means therethrough for admitting pressurized pumping fluid onto and over said pumping fluid distribution plate, said bottom plate having at least one elongated hollow pipette, mounted on said bottom plate extending a way from said top plate and in fluid communication with said pumping fluid distribution plate; and a first resilient membrane disposed between said pumping fluid distribution plate and said bottom plate, said bottom plate having at least one spaced cavity thereon having an outer periphery and in fluid communication with said pipette, said pumping fluid distribution plate having at least one apertured member having an outer periphery substantially coinciding with the other periphery of said cavity; and a second resilient membrane disposed between said top plate and said pumping fluid distribution plate having an opening therethrough in fluid communication with both the top plate and the pumping fluid distribution plate; and whereby, when a pressurized source of pumping fluid is injected into said dispenser housing via said inlet means, said pumping fluid flows under pressure over said pumping fluid distribution plate, out of the aperture in said member and against said membrane forcing portions of said membrane overlying said cavity down into said cavity thus displacing any contents of said pipette out of said pipette.

* * * * *